Nov. 4, 1924.  
H. M. NORWOOD  
1,513,926

DISPENSING CABINET FOR SOFT DRINKS

Filed Aug. 6, 1923

Inventor  
H. M. NORWOOD.

By  
Attorney

Patented Nov. 4, 1924.

1,513,926

UNITED STATES PATENT OFFICE.

HUBERT M. NORWOOD, OF BIRMINGHAM, ALABAMA, ASSIGNOR TO ECONOMY FOUNTAIN COMPANY, A CORPORATION OF DELAWARE.

DISPENSING CABINET FOR SOFT DRINKS.

Application filed August 6, 1923. Serial No. 656,072.

*To all whom it may concern:*

Be it known that I, HUBERT M. NORWOOD, a citizen of the United States of America, residing at Birmingham, in the county of Jefferson and State of Alabama, have invented certain new and useful Improvements in Dispensing Cabinets for Soft Drinks, of which the following is a specification.

My invention relates to dispensing cabinet for soda water, soft drinks, ice cream and the like, which is especially adapted to constitute a complete dispensing stand for small stores, which can be constructed at a comparatively small expense and which can be operated at high efficiency both from the point of view of ice consumption and of dispensing service.

More particularly, my object has been to design a complete dispensing outfit, compact in its construction and designed to take care of all of the essential requirements of a large expensive soda fountain dispensary, which can be placed in the hands of small merchants, country drug stores, and the like at so low a cost that they can practically eliminate the sale of bottled soda and soft drinks and dispense the same as in the case of the ordinary soda fount. The great advantage of this lies in the fact that the transportation of water and the handling of bottles is eliminated, and a freshly carbonated drink can be dispensed with a far greater margin of profit than exists with the bottled goods.

A further object of my invention is to design the dispensing cabinet so as to embrace in its construction provisions to care for every requirement in connection with the sale of iced or refrigerated goods which the small store may have, and particularly for the handling of ice cream.

A further object, and one which is of vital importance to the economic ice consumption of the apparatus, is the provision of novel means for maintaining the carbonated water and syrup adequately chilled so that drinks can be served without the use of crushed ice, by exposing the water and syrup to the refrigerating medium in the cabinet so as to avoid the freezing of the carbonated water and syrup, notwithstanding its exposure to the ice salt or brine mixture.

A further feature of my invention lies in the provision in the cabinet of a common iced compartment having a top door giving access to an ice cream can and at the rear having the syrup tanks as well as the carbonated water cooling tank entering into the ice body to be thereby chilled.

My invention comprises the novel details of construction and arrangements of parts, which in their preferred embodiment only are illustrated in the accompanying drawings, in which:—

Similar reference numerals refer to similar parts throughout the drawings.

Figure 1:
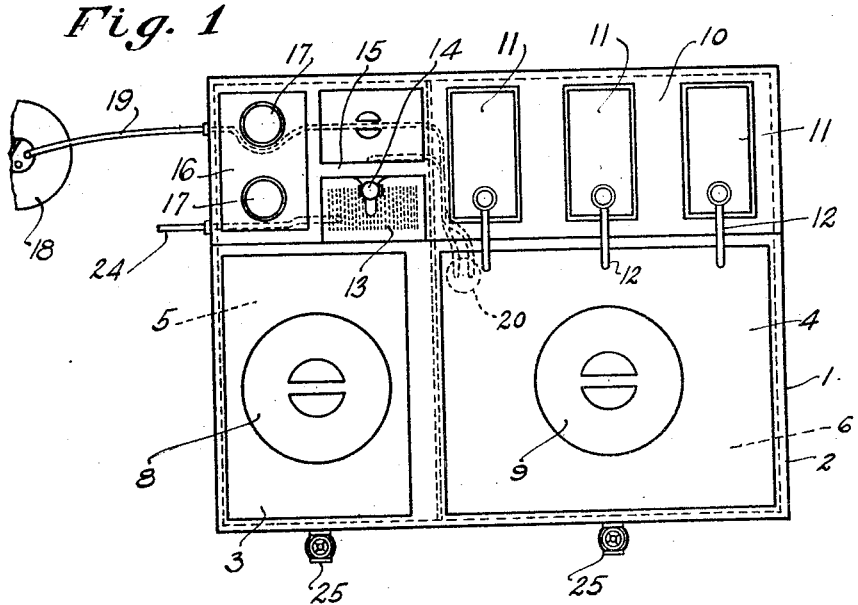
Fig. 1 is a plan view of the dispensing cabinet.
Figure 3:
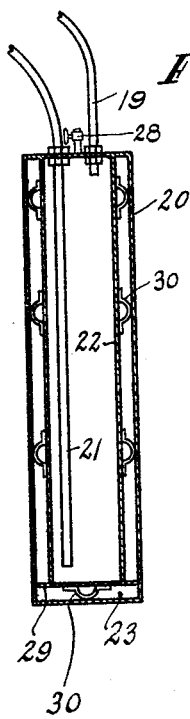
Fig. 3 is a detail cross-sectional view through the carbonated water cooler.
Figure 2:
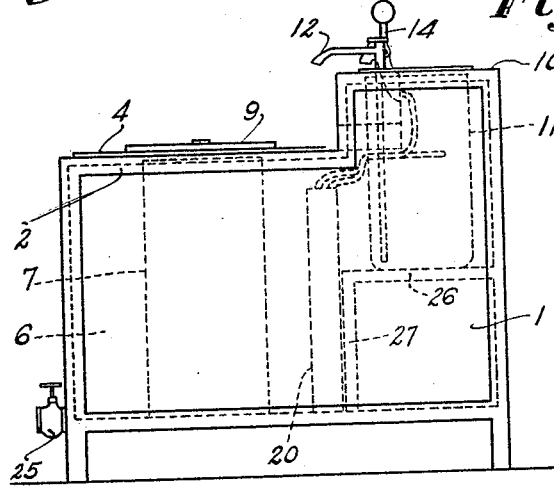
Fig. 2 is an end elevation of the same.

In the embodiment of my invention illustrated, I show a main cabinet 1 having across its front top portion 2 a pair of removable lids 3 and 4 forming top closures for the main storage compartments 5 and 6. These compartments are normally adapted to receive ice and salt or brine solutions and to have mounted therein containers 7 suitable for the reception of any goods to be chilled, particularly ice cream. Removable lids 8 and 9 are provided above the containers 7 and are of any standard character. The rear portion of the cabinet rises above the top 2 and in the top 10 of this raised portion are openings to receive standard syrup tanks 11 which depend into the ice chamber 6 low enough to be exposed to the ice or ice water which collects at the top of the compartment but not low enough to extend below the normal operating brine level, as the brine would freeze the syrup. These tanks are provided with the usual syrup pumps 12 which overhang the cabinet top 2 with sufficient clearance for the introduction of glasses under them to receive the syrup discharged therefrom. A drain 13 is provided at one side of the syrup tanks and a draft arm 14 is mounted in a wall 15 of the cabinet in position to drip into this drain. At the other side of the drain is provided a compartment having a cover 16 provided with receptacles 17 for glasses, straws and the like.

A carbonated water container 18 is provided, having a pipe connection 19 leading therefrom through the cabinet and discharging into the top of a water cooler or chilling chamber 20. An outlet pipe for the carbonated water leading from the bottom of the cooler 20 leads to the draft arm 14. I attach the greatest importance to the construction and operation of this cooler 20. It will be observed that it is formed with an inner wall 22 spaced from its outer wall to form the air space 23 surrounding the water containing chamber on all sides and below and air is partially exhausted from this chamber to afford an insulation to such a degree only as to permit the adequate chilling of the water while preventing its freezing. If a single wall tank were immersed in the brine, water therein would freeze quickly and prevent the successful operation of the apparatus.

A suitable drain pipe 24 is provided for the drain 13 and brine drains 25 are provided for the tanks 5 and 6. In order to reduce the amount of ice required in the compartment 6 and to better support the syrup tanks 11, I form across the rear portion of the compartment 6 rectangularly disposed partition walls 26 and 27 which form an offset adapted to support the syrup jars and provide a dead air chamber between its wall 27 and the rear wall of the cabinet which will more effectively reduce the ice consumption by radiation of heat through the back wall of the compartment 6. It is contemplated that there will be furnished with the cabinet the ordinary means for carbonating the water in container 18 as it may be required and with such container 18 connected up to the water chilling tank 20 the operation of the apparatus is as follows. The compartment 6 is packed with ice and salt and the ice cream, if used, is filled into the receptacle 7, the syrup jars are filled and in a few minutes the syrup in the jars will be chilled and the water in the cooler 20 will be as cold as needed for drinks. If it is desired to dispense any bottled goods or goods requiring refrigeration, the compartment 5 can also be iced and the goods dispensed from the container 7 therein. Inasmuch as the cold water settles to the bottom of the cooler 20 and the warm replacement water enters the top, I have found in practice, in any ordinary use of the cabinet, that this water becomes amply chilled by the time it reaches the bottom of the cooler from which point alone it can be drawn off. The syrup and water both being effectively chilled, no icing of the dispensed drink is needed.

The apparatus as a whole is very compact in construction, pleasing in appearance, and capable of dispensing, by the use of only three syrup jars, about ninety percent of the drinks ordinarily called for at soda founts. Its utility for the small store is thus obvious and its economy of operation makes it an ideal apparatus for the dispensing of soda water and soft drinks.

The cooler 20 preferably is provided with a gas relief valve 28 to exhaust the gas and permit the cooler to fill full of carbonated water when it is first charged and thereafter it will remain full of water.

To strengthen the cooler I provide the bottom of the inner wall or chamber 22 with a marginal flange 29 which engages the wall of 20 and holds 22 centered therein. Also stop braces 30 are connected at suitable intervals to the sides and bottom of 22 and adapted to engage and brace the walls of the cooler 20. The partial vacuum in the chamber 23, which is preferred for insulating the cooler, may be produced by rarefying or partially exhausting the air in any well known manner.

Having thus described my invention, what I claim is new and desire to secure by Letters Patent, is:—

1. A dispensing cabinet of the character described, comprising a compartment adapted to be charged with salt and ice, and containers for syrups and carbonated water disposed in said compartment, said water container being immersed in the ice and brine and being insulated to prevent the freezing of its contents, and said syrup containers being disposed above the normal brine level in said compartment.

2. A dispensing cabinet according to claim 1, in which said compartment is adapted to receive an ice-cream receptacle disposed therein so as to be surrounded by the ice and brine.

3. A dispensing cabinet of the character described, comprising a compartment extending from front to rear and adapted to contain salt and ice and to receive an ice-cream can, said compartment having a removable top cover to give access to said can, a partition extending across the rear of said compartment and forming a seat adapted to support the syrup jars above the normal level of the brine in said compartment, and a carbonated water cooler insulated by a partial vacuum and immersed in the brine and ice in said compartment.

4. A dispensing cabinet according to claim 3 in which said partition is angled and forms a dead-air chamber on which the syrup jars rest.

In testimony whereof I affix my signature.

HUBERT M. NORWOOD.

Witness:
NOMIE WELSH.